Dec. 11, 1945.   LE ROY S. DUNHAM ET AL   2,390,574
PRIMARY BATTERY
Filed March 22, 1944
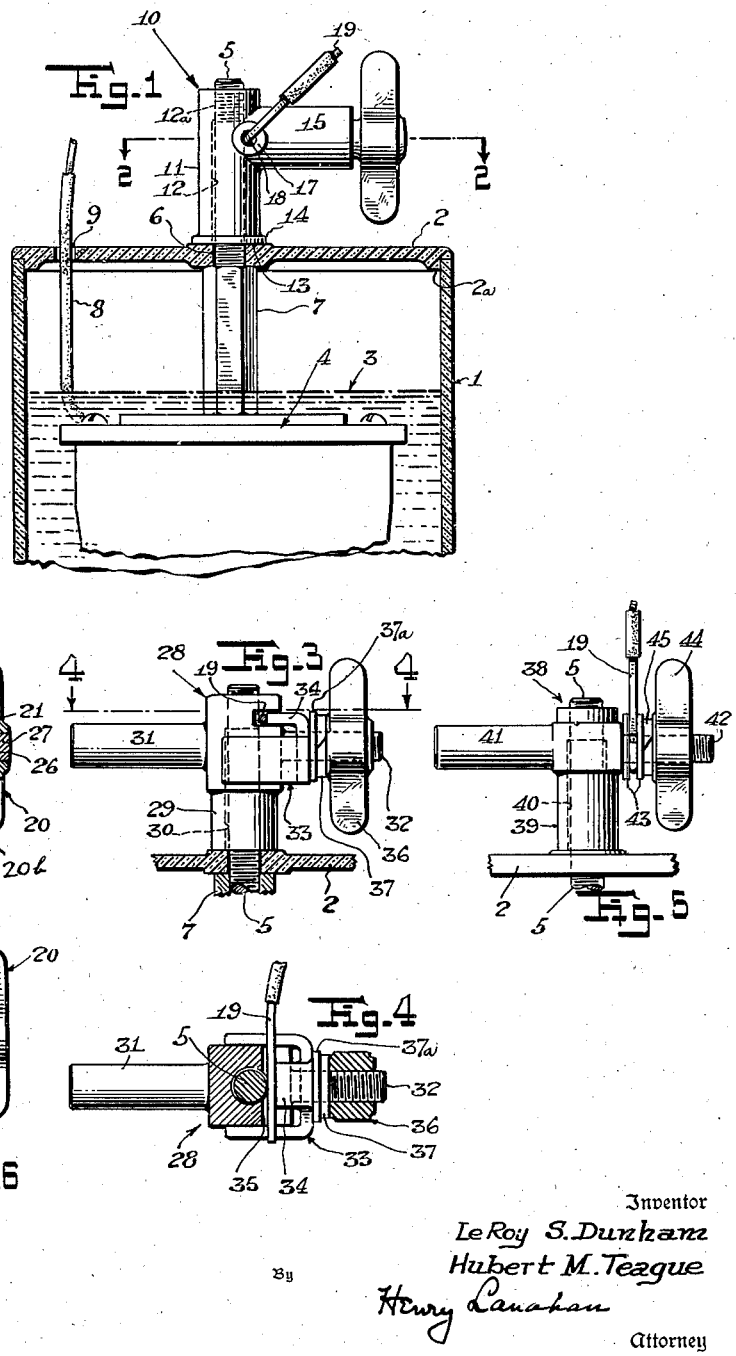
Inventor
Le Roy S. Dunham
Hubert M. Teague
By Henry Lanahan
Attorney Patented Dec. 11, 1945

2,390,574

UNITED STATES PATENT OFFICE 2,390,574

PRIMARY BATTERY

Le Roy S. Dunham, East Orange, and Hubert M. Teague, Bloomfield, N. J., assignors to Thomas A. Edison, Incorporated, West Orange, N. J., a corporation of New Jersey Application March 22, 1944, Serial No. 527,579

11 Claims. (Cl. 136—102)

Our invention relates particularly to the class of primary batteries in which the active electrodes are consumed during the use of the batteries and have to be replaced, or renewed, at intervals to keep the batteries in working condition.

An object of our invention is to provide improvements for such batteries which are adapted to permit the active electrode elements to be replaced quickly, easily and inexpensively.

Another object is to provide a simple device which will enable more durable lead connections to be made to such batteries.

The usual form of primary battery of the class mentioned has an electrode consisting of one or more plates of molded copper oxide and another electrode consisting of one or more plates of zinc. These plates are immersed in a caustic alkali electrolyte that is contained in a suitable jar having a removable cover or lid. The plates are held together into a unitary assembly, and the whole assembly is suspended from the cover by a suspension bolt which serves also as a binding post for one of the electrodes of the battery. In these batteries the plate assemblies are used up and have to be renewed, but the jar and cover are permanent parts which are used over and over again with successive plate assemblies, or renewals as they are frequently termed. In some installations the same jars and covers have been in use now for more than thirty years.

It has been standard practice to secure the suspension bolt to the cover by means of a small hexagonal nut and to make the necessary external lead connection to the bolt by placing a pair of washers on the bolt above the hexagonal nut, inserting the lead wire between the washers, then threading a wing nut on the bolt against the upper washer and next threading a second wing nut on the bolt to lock the first wing nut in place. In replacing the plate assembly, all of these parts have to be removed (the hexagonal nut with the use of a wrench), laid aside and then picked up again and put in place. This is of course a very tedious procedure involving many manipulations and the chance of losing parts. Particularly, it will be apparent that it has been a very burdensome and time-consuming job to replace the plate assemblies of a large number of batteries, and this will be understood to be all the more true when it is considered that many installations of these batteries are out-of-doors, such as is frequently the case with those used for railroad signaling, and the operator may be required to replace the plate assemblies of these batteries during wintertime with the use of gloves, with the result that the small nuts and washers which he is required to remove and replace become extremely difficult to handle.

By the present invention, the laborious and tedious procedure heretofore required in replacing battery plate assemblies of primary batteries is largely overcome. This is accomplished by providing a single, unitary battery connector device which is adapted to take the place of the group of parts comprising the hexagonal nut, washers and wing nuts as heretofore used. With our invention, the number of manipulations required to replace a battery plate assembly is very greatly reduced, only one loose part is required to be removed, and all operations can be performed by hand so that no wrenches are required. Moreover, it is a feature of our invention that to remove this part it need be threaded along a short length of the suspension bolt, and that the part shall be relatively large so that it shall not be readily misplaced or lost while it is removed from the bolt.

A further feature of this connector device is that it enables a positive and durable lead connection to be made to the battery which will withstand handling, vibration and accidental manipulations without opening or loosening.

These and other objects and features of our invention will more fully appear from the following description and the appended claims.

In the description of our invention reference is had to the accompanying drawing, of which:

Figure 1 is a fractional elevational view of a primary battery, showing however the battery jar and cover in section, to which one embodiment of our invention is applied;

Figure 2 is a sectional view taken on the line 2—2 of Figure 1;

Figure 3 is a fractional view of a battery showing a second embodiment of our invention applied thereto;

Figure 4 is a sectional view taken on the line 4—4 of Figure 3;

Figure 5 is a fractional view of a battery to which a third embodiment of our invention is applied; and Figure 6 is a view illustrating a modification in our invention.

In Figure 1 there is shown a conventional primary battery comprising a jar 1, fractionally shown, which is made typically of glass and on the top of which there is a lid or cover 2 typically made of glass or porcelain, the cover having an annular shoulder 2a depending therefrom which engages the rim of the jar to hold the cover in place. The jar contains a liquid electrolyte 3 and has an electrode plate assembly 4 suspended from the cover and immersed in the electrolyte. Typically, the electrolyte 3 comprises a solution of caustic soda and the plate assembly comprises a group of alternate copper oxide and zinc plates. It will be understood that these plates are held mechanically together in a unitary structure, and that adjacent plates are spaced and insulated from each other but that alternate plates of respective polarities are electrically interconnected. This plate assembly forms, however, no part of our invention and is accordingly herein diagrammatically shown. For a detailed description of the construction and arrangement of a suitable plate assembly, reference may be had to Eddy Patent No. 2,175,885.

The plate assembly 4 has a long externally-threaded post or bolt 5 which extends upwardly from the top portion thereof and which forms a means for attaching the assembly to the top cover 2. This bolt projects through a central hole 6 in the cover and is held to the cover by a means threaded onto the exterior extending portion thereof as is hereinafter described. Between the cover and the plate assembly however there is on the bolt a spacing nut 7 which is clamped tightly against the bottom of the cover when the bolt is secured in place. This spacing nut serves to hold the plate assembly at a suitable level below the cover. The bolt is connected electrically to the electrode plates of one polarity and forms one terminal for the battery. The electrical connection to the plates of the other polarity is made by way of a lead 8 through an opening 9 in the cover.

As abovementioned, it has been standard practice to secure the suspension bolt 5 to the cover by a small hexagonal nut and to make a lead connection to the bolt by a pair of washers and a pair of wing nuts; and in order that the part of the bolt extending above the cover may receive these nuts and washers it is standard practice in the construction of primary batteries to extend the bolt a distance of the order of 1¼" above the cover. In the present invention, we provide a single unitary connector device which is adapted to fit onto this standard length of suspension bolt and take the place of the group of nuts and washers as heretofore used. This device eliminates the many tedious and time-consuming manipulations which have been required heretofore in replacing battery plate assemblies; moreover, the device has the advantage that it provides a stronger battery assembly and permits a stronger and more durable lead connection to be made to the battery. To accomplish these and the other aforementioned objectives, the connector device has incorporated therein certain distinctive features of design, which are herein illustrated by certain preferred embodiments of the device.

In the embodiment of our invention shown in Figures 1 and 2 the battery connector device, referred to as 10, comprises a frame member having a vertical body portion 11 provided with a central bore 12. The body portion has an axial length which is preferably just slightly shorter than the length of the extending part of the bolt 5. The bore 12, which is to receive the bolt 5, is threaded to engage the bolt at only its upper portion 12a, as along the length of about five threads of the bolt, and the remaining lower portion of the bore has a greater diameter to freely receive the bolt. The bottom face 13 of the body portion 11 is flat and enlarged by the provision of a surrounding annular shoulder 14 so that the member 11 may seat firmly on the cover and have a large area of surface engagement therewith.

The frame member also integrally includes a side arm 15 which extends from the top part of the body portion 11 at right angles thereto. This arm has an axial hole 16 communicating with the bore 12. Also, the frame member has two bosses 17 at opposite sides of the arm. Extending through these bosses is an opening 18 which intersects the axis of the hole 16 at approximately the junction point between this hole and the bore 12. It will be understood that this frame member as above described may be readily formed by casting and will typically be made of brass or other suitable material.

The opening 18 is adapted to receive a bared end portion of a connecting lead wire 19, and is preferably made somewhat larger in diameter than is the diameter of this lead wire. This lead wire is secured to the connector device by a clamping means 20 which threads into the bore of the arm 15. This clamping means comprises a screw 20a which threads into the hole 16 and has wings 20b on its outer end portion so that it may be readily turned by hand. This screw 20a has an axial opening 21 extending therethrough, the outer portion of which is enlarged in diameter so as to provide an interior annular shoulder 22. Slidably and rotatably fitting the interior reduced-diameter portion of the opening 21 is a plunger 23 having a head 24 on the inner end thereof which fits the hole 16. This plunger is pressed inwardly, relative to the connector device, by a compression spring 25 that is interposed between the head 24 and the end of the wing screw 20a. The plunger is retained to the wing screw 20a such, for example, as by a pair of interlocked nuts 26 which are threaded onto the outer end of the plunger for abutment against the shoulder 22. These nuts also serve as a means for adjusting the spring 25 to any predetermined loading. The outer end of the opening 21 is preferably closed by a plug 27.

To secure a battery plate assembly to the cover 2 with the use of the connector device 10, it is only necessary to seat the device on the projecting end of the suspension bolt 5 and to give the device a few turns by the hand, a final tightening of the device being also done by hand since the side arm 15 has sufficient length to enable the operator to get a firm strong grip on the device. To secure the lead 19 to the device, it is only necessary to insert the lead into the opening 18 and then to tighten the wing screw 20a. Vice versa, to remove a battery plate assembly it is only necessary to loosen the wing screw, pull out the wire 19 from the opening 18 and then to give the device a few turns by hand to remove it from the suspension bolt. It will be noted that since the device is relatively large, it is easy to handle and is not apt to be mislaid when it is removed to install a new battery plate assembly onto the cover. Also, it will be observed that the side arm 15 serves as a convenient handle both for tightening and loosening the device on and from the suspension bolt and for lifting an old battery plate assembly and cover from the jar and putting a new plate assembly and cover into the jar.

As the clamping means 20 is threaded inwardly to secure the wire 19 to the connector device, the spring 25 is compressed and the wire is pressed into engagement with the threads of the bolt; preferably, the spring 25 is so chosen that it will be wholly compressed into a solid column as the clamping means is tightened by the hand. The pressure of the wire against the bolt causes it to be nicked by the threads of the latter and to be positively electrically connected to the bolt; these nicks do not however weaken the mechanical strength of the wire since they run lengthwise of the wire and parallel to the grain of the wire. To prevent the head 24 from turning and abrading the wire as the clamping means is tightened, the head may be provided with cleats 24a. With this connecting means, it will be observed that the wire will not be loosened by accidental unthreading of the clamping means 20 because the spring 25 continues to exert clamping pressure against the wire and to frictionally hold the clamping means from loosening within the range of several turns of unthreading of the wing screw. Also, the wire will not tend to break from tugging because the bosses 17 with the enlarged hole 18 serve to prevent sharp bends in the wire and to take up stresses from the joint between the wire and the suspension bolt.

In Figures 3 and 4 we show another connector device 28 according to a second embodiment of our invention. This device comprises a frame member having again a relatively long body portion 29 provided with a central bore 30. This bore has a clearance size from the bottom to near the top thereof and is interiorly threaded through its remaining upper portion for engagement with the threads of the suspension bolt. The frame member has also a side arm 31 extending from the top of the body portion which is adapted to permit the device to be gripped firmly by the hand and tightened against the cover and loosened therefrom as desired. At the side of the body portion opposite the arm, the frame member has an exteriorly-threaded post 32. The upper part of the body portion 29 may be square-shaped as viewed from the top, and on the post there is an apertured U-shaped clamping member 33 the side legs of which slidably engage the flat sides of the body portion. This clamping member has a turned-over lug 34 which engages a transverse slit 35 in the body portion of the frame member, this slit intersecting the bore 30 as shown. On the end of the post there is a wing nut 36, and between the wing nut and clamping member there is a plain washer 37a and a spring-type lock washer 37 for holding the wing nut in place when the nut is tightened against the clamping member.

In connecting a plate assembly to the cover the connector device 28 is threaded onto the suspension bolt and tightened against the cover by hand, the lead wire 19 is inserted into the slit 35 and the wing nut 36 is then tightened against the clamping member 33. Vice versa, to remove a plate assembly from the cover it is only necessary to loosen the wing nut, pull out the lead wire and then unthread the device from the suspension bolt, all of which can be done with very few manipulations.

It will be understood that when the connector device is threaded onto the bolt, the threads of the bolt extend into the slit 35. Thus, when the lead wire is inserted into the slit 35 and the clamping member is tightened against the lead wire by the wing nut 36, the lead wire will be pressed into engagement with the bolt, and a positive electrical connection of the wire to the bolt is obtained. Again, the wire will be nicked by the threads of the bolt, but these nicks will extend lengthwise of the wire and will not weaken it mechanically. For obtaining a yet stronger joint, the end face of the lug 34 which engages the wire may be knurled as shown in Figure 4. Also, it will be understood that in view of the yieldability of the lock washer 37 the wing nut is frictionally held from loosening within the range of turning movement thereof wherein the nut exerts pressure against the clamping member.

In Figure 5 we show a connector device 38 according to a third embodiment of our invention. The frame member of this device has substantially the same form as the frame member of the preceding device of Figures 3 and 4 in that it has a main body portion 39 provided with a central bore 40 and has a side arm 41 and a diametrically oppositely located threaded post 42. Again, the bore has a clearance size from the bottom of the body portion to near the top thereof and is threaded along its remaining length for engagement with the suspension bolt 5. In this case, however, the lead wire 19 is secured to the connector device by interposing it between two washers 43 provided on the post 42 and clamping these washers against the lead wire by a wing nut 44. Also, between the outer clamping washer and wing nut there is a spring-type locking washer 45 for frictionally holding the wing nut from loosening within the range of turning movement of the wing nut wherein it exerts clamping pressure against the washers. In this embodiment, it will be understood that the end of the wire 19 is preferably bent in the form of a loop so that it will partially surround the post 42 through the greater part of one revolution and be then firmly joined to the connector device when the washers are clamped against the wire.

In Figure 6 we show a modified form of our invention which is adapted for use with battery plate assemblies which have an internally-threaded upstanding post in place of the long exteriorly-threaded suspension bolt above considered. For example, this post may comprise the spacing nut 7, the nut being secured in place by being threaded to a short bolt 46 extending up from the plate assembly. This modified connector device, which is here referred to as 47, has a vertical body portion 48 provided integrally with a depending bolt 49. This bolt is to project through the central hole of the cover 2 and to thread into the upper portion of the spacing nut 7 so as to clamp the plate assembly to the cover. In other respects this connector device may be arranged according to either of our embodiments above described. By way of illustration, we herein show the device as being arranged according to our embodiment of Figures 1 and 2, it having an internally-threaded side arm 15, a wire-receiving opening 18 and a wire-clamping means 20, the same as has that embodiment. Also, there may if desired be provided a screw thread against which the lead wire may be clamped as by threading a short headless screw 50 into the top portion of the connector device, a portion of the threads of which are exposed to the wire-receiving opening 18. It will be understood that the manner in which this connector device is used and the functioning of the device are the same as with the foregoing embodiments.

The embodiments of our invention herein shown are intended to be illustrative and not necessarily limitative of our invention as these embodiments are subject to changes and modifications without departure from the scope of our invention, which we endeavor to express according to the following claims.

We claim:

1. In a primary battery having a replaceable electrode assembly provided with an upstanding threaded post for connection with an apertured cover of the battery container: a connector device comprising a frame member having a body portion adapted to thread to said post for securing the electrode assembly to the cover, said body portion having a side arm by which the frame member may be firmly gripped to turn it tightly onto and remove it from the post by hand; and a wire-connecting means on said frame member including a wire-clamping member, hand operable screw-threaded means on the frame member for actuating said clamping member, and resilient means associated with said hand-operable means for frictionally holding the latter against loosening from a tightened position.

2. In a primary battery having a replaceable electrode assembly provided with an upright suspension bolt adapted to project through and be secured to an apertured cover of the battery container: a connector device comprising a frame member having a body portion provided with a central bore for receiving the projecting length of said bolt above the cover, said bore being threaded only at its upper end portion for engagement with said bolt; a side arm on said body portion by which the frame member can be gripped firmly by hand and tightened on the bolt to secure said assembly to the cover; and a lead-wire-connecting means comprising a wire-clamping member, hand-operable screw-threaded means on said frame member for actuating said clamping member, and resilient means associated with said hand-operable means for frictionally holding the latter in a tightened position.

3. In a primary battery having a replaceable electrode assembly provided with an upstanding threaded post for connection with an apertured cover of the battery container: a unitary connector device adapted to thread to said post to secure said assembly to said cover, said connector device having a side arm to facilitate its being turned by hand; and a wire-connecting means on said device comprising a wire-receiving opening, abutment means forming a side wall portion of said opening and having grooves extending lengthwise of the opening, a wire-clamping member cooperating with said abutment means for clamping a wire therebetween, hand-operable means for actuating said clamping member, and means associated with said hand-operable means for releasably holding the latter against loosening from a tightened position.

4. In a primary battery having a replaceable electrode assembly provided with a suspension bolt adapted to project through and be secured to an apertured cover of the battery container: a unitary connector device comprising a frame member having a body portion provided with an internally-threaded bore for engagement with the projecting portion of said bolt above the cover; a side arm on said body portion adapted to permit the frame member to be tightened onto the bolt and be removed therefrom by hand, said body portion having a wire-receiving opening exposing a threaded portion of said bolt; wire-clamping means on said frame member for clamping a wire between it and said threaded portion of the bolt; and means associated with said clamping means for holding the same against loosening from a tightened position.

5. In a primary battery having a replaceable electrode assembly provided with an upstanding threaded post for connection with an apertured cover of the battery container: a unitary connector device adapted to thread to said post to secure said assembly to said cover, said connector device having a side arm to facilitate its being turned by hand; and a wire-connecting means on said device comprising a wire-clamping member, hand-operable threaded means for exerting clamping pressure against said clamping member, and resilient means interposed between said clamping member and said hand-operable means for frictionally holding the latter from loosening within a range of turning movement thereof wherein the same exerts pressure against said clamping member.

6. In a primary battery having a replaceable electrode assembly provided with an upstanding threaded post for connection with an apertured cover of the battery container: a connector device comprising a frame member having a body portion adapted to thread to said post to exert pressure against said cover for holding the electrode assembly to the cover; a threaded member secured to said frame member and extending sidewise from the body portion; a lead-wire-clamping member associated with said threaded member; hand-operable threaded means engaging said threaded member for operating said clamping member; and resilient means interposed between said clamping member and hand-operable means for frictionally holding the hand-operable means against loosening within a range of turning movement thereof wherein the same exerts pressure against said clamping member.

7. In a primary battery having a replaceable electrode assembly provided with a suspension bolt adapted to project through and be secured to an apertured cover of the battery container: a connector device comprising a frame member having a body portion adapted for threaded engagement with the portion of the bolt extending above the cover; a lead-wire-clamping means comprising a clamping member mounted on said frame member for transverse movement toward and away from an exposed threaded portion of said bolt; and hand-operable threaded means cooperating with said clamping member for exerting pressure on the latter whereby to press a lead wire into engagement with said threaded portion of said bolt.

8. In a primary battery having a replaceable electrode assembly provided with a suspension bolt for supporting the assembly from an apertured cover of the battery container: a connector device comprising a frame member having a body portion provided with a bore for threaded engagement with the portion of the bolt extending above the cover, said body portion having an opening extending therethrough in transverse relation to and in communication with said bore, said opening being adapted to receive a lead wire for connection with said bolt; a clamping member mounted on said frame member for transverse movement into and out of said opening; and hand-operable means on said frame member and in association with said clamping member for actuating the latter whereby to clamp a lead wire into engagement with the threaded portion of said bolt.

9. In a primary battery having a replaceable electrode assembly provided with an upstanding threaded post for connection with an apertured supporting cover of the battery container: a connector device comprising a frame member adapted to thread to said post to exert pressure against the top side of said cover for securing the electrode assembly to the cover, said frame member having an exterior boss provided with a central hole for loosely receiving a lead wire; a clamping member movable transversely across an inner portion of said hole; a hand-operable threaded means on said frame member for actuating said clamping member whereby to clamp the lead wire to said frame member; and resilient means interposed between said hand-operable means and said clamping member for frictionally holding the hand-operable means against loosening from a tightened position.

10. In a primary battery having a replaceable electrode assembly provided with a suspension bolt adapted to project through and be connected to an apertured cover of the battery container: a connector device comprising a frame member having a body portion provided with a bore for threaded engagement with the portion of the bolt extending above the cover, said body portion having an opening extending therethrough in transverse relation to and in communication with said bore, said opening being adapted to receive a lead wire for connection with said bolt; a side arm on said body portion adapted to permit the device to be gripped by the hand and turned tightly onto and removed from the bolt, said arm having a hole extending axially therethrough at right angles to said opening and said bore and communicating with both the opening and bore; and clamping means threadingly engaging the axial hole of the arm for exerting sidewise pressure against a lead wire within said opening whereby to press the lead wire into engagement with said bolt.

11. In a primary battery having a replaceable electrode assembly provided with a suspension bolt adapted to project through and be connected to an apertured cover of the battery container: a connector device comprising a frame member having a body portion provided with a bore for threaded engagement with the portion of the bolt extending above the cover, said body portion having a transverse slit communicating with said bore and adapted to receive a lead wire for connection with said bolt; a clamping member on said frame member for movement into and out of said slit and toward and away from said bolt; and hand-operable means on said frame member and in association with said clamping member for operating the latter whereby to clamp a lead wire against said bolt.

LE ROY S. DUNHAM.
HUBERT M. TEAGUE.